United States Patent
Mc Donald et al.

(10) Patent No.: US 7,441,451 B2
(45) Date of Patent: Oct. 28, 2008

(54) DIAGNOSTIC METHODS AND SYSTEMS FOR ACTIVE FUEL MANAGEMENT SYSTEMS

(75) Inventors: Mike M. Mc Donald, Macomb, MI (US); William C. Albertson, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 91 days.

(21) Appl. No.: 11/669,266

(22) Filed: Jan. 31, 2007

(65) Prior Publication Data

US 2008/0183373 A1    Jul. 31, 2008

(51) Int. Cl.
*G01M 15/00* (2006.01)
(52) U.S. Cl. .................................... 73/114.79
(58) Field of Classification Search .............. 73/114.02, 73/114.07, 114.77, 114.79, 115.01, 35.01, 73/35.07, 35.09
See application file for complete search history.

(56) References Cited

U.S. PATENT DOCUMENTS

| | | | |
|---|---|---|---|
| 7,082,918 B2 * | 8/2006 | Rozario et al. | 123/196 R |
| 7,086,374 B2 * | 8/2006 | McDonald et al. | 123/198 F |
| 7,302,921 B2 * | 12/2007 | McDonald et al. | 123/90.12 |
| 7,357,019 B2 * | 4/2008 | Mc Donald et al. | 123/198 F |
| 2003/0106519 A1 * | 6/2003 | Patel et al. | 123/198 F |
| 2005/0257768 A1 * | 11/2005 | McDonald et al. | 123/198 F |
| 2007/0119406 A1 * | 5/2007 | Mc Donald et al. | 123/198 F |
| 2008/0093172 A1 * | 4/2008 | Albertson et al. | 184/6.4 |

OTHER PUBLICATIONS

U.S. Appl. No. 11/290,005, filed Nov. 30, 2005.

* cited by examiner

*Primary Examiner*—Eric S McCall

(57) ABSTRACT

A diagnostic system for an active fuel management (AFM) solenoid of an internal combustion engine is provided. The system includes: a command module that selectively commands a solenoid signal to energize and de-energize the AFM solenoid, a timer module that activates a timer based on a status of the solenoid signal, and a fault module that selectively diagnoses a fault of the AFM solenoid based on the timer and a knock sensor signal.

19 Claims, 5 Drawing Sheets

DIAGNOSTIC METHODS AND SYSTEMS FOR ACTIVE FUEL MANAGEMENT SYSTEMS

FIELD

The present invention relates to internal combustion engines and more particularly to methods and systems for diagnosing solenoids of an active fuel management system.

BACKGROUND

The statements in this section merely provide background information related to the present disclosure and may not constitute prior art.

Some internal combustion engines include engine control systems that deactivate cylinders under specific low load operating conditions. For example, an eight cylinder engine can be operated using four cylinders to improve fuel economy by reducing pumping losses. This process is generally referred to as active fuel management (AFM). Operation using all of the engine cylinders is referred to as an activated mode. A deactivated mode refers to operation using less than all of the cylinders of the engine (one or more cylinders not active).

In the deactivated mode, there are fewer firing cylinders. As a result, there is less drive torque available to drive the vehicle driveline and accessories (e.g., alternator, coolant pump, A/C compressor). Engine efficiency, however, is increased as a result of decreased air pumping losses due to the deactivated cylinders not taking in and exhausting fresh intake air.

A lifter oil manifold assembly (LOMA) can be implemented to activate and deactivate select cylinders of the engine. The LOMA includes a series of solenoids that are used to control oil delivery to hydraulically switching lifters. The solenoids are selectively energized to enable hydraulic fluid flow to the lifters to inhibit valve lifter operation, thereby deactivating the corresponding cylinders. The solenoids remain energized while the engine operates in the deactivated mode. The solenoids are de-energized when reactivation of the deactivated cylinders is desired.

SUMMARY

Accordingly, a diagnostic system for diagnosing a solenoid of an active fuel management system is provided. The diagnostic system includes: a command module that selectively commands a solenoid signal to energize and de-energize the solenoid; a timer module that activates a timer based on a status of the solenoid signal; and a fault module that selectively diagnoses a fault of the solenoid based on the timer and a knock sensor signal.

In other features, an active fuel management (AFM) engine diagnostic system is provided. The system includes: an active fuel management solenoid that controls hydraulic fluid to and from a valve lifter; a knock sensor that generates an impact signal based on an operation of the AFM solenoid; and a control module that commands an AFM solenoid signal, begins a timer after commanding the solenoid signal, and selectively diagnoses a fault of the AFM solenoid based on the impact signal and the timer.

Still in other features, a method of diagnosing an active fuel management (AFM) solenoid of an internal combustion engine is provided. The method includes: selectively commanding a solenoid signal to energize and de-energize the AFM solenoid; activating a timer based on a status of the solenoid signal; monitoring a knock sensor signal; and selectively diagnosing a fault of the solenoid based on the timer and the knock sensor signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The drawings described herein are for illustration purposes only and are not intended to limit the scope of the present disclosure in any way.

DETAILED DESCRIPTION

Figure 1:
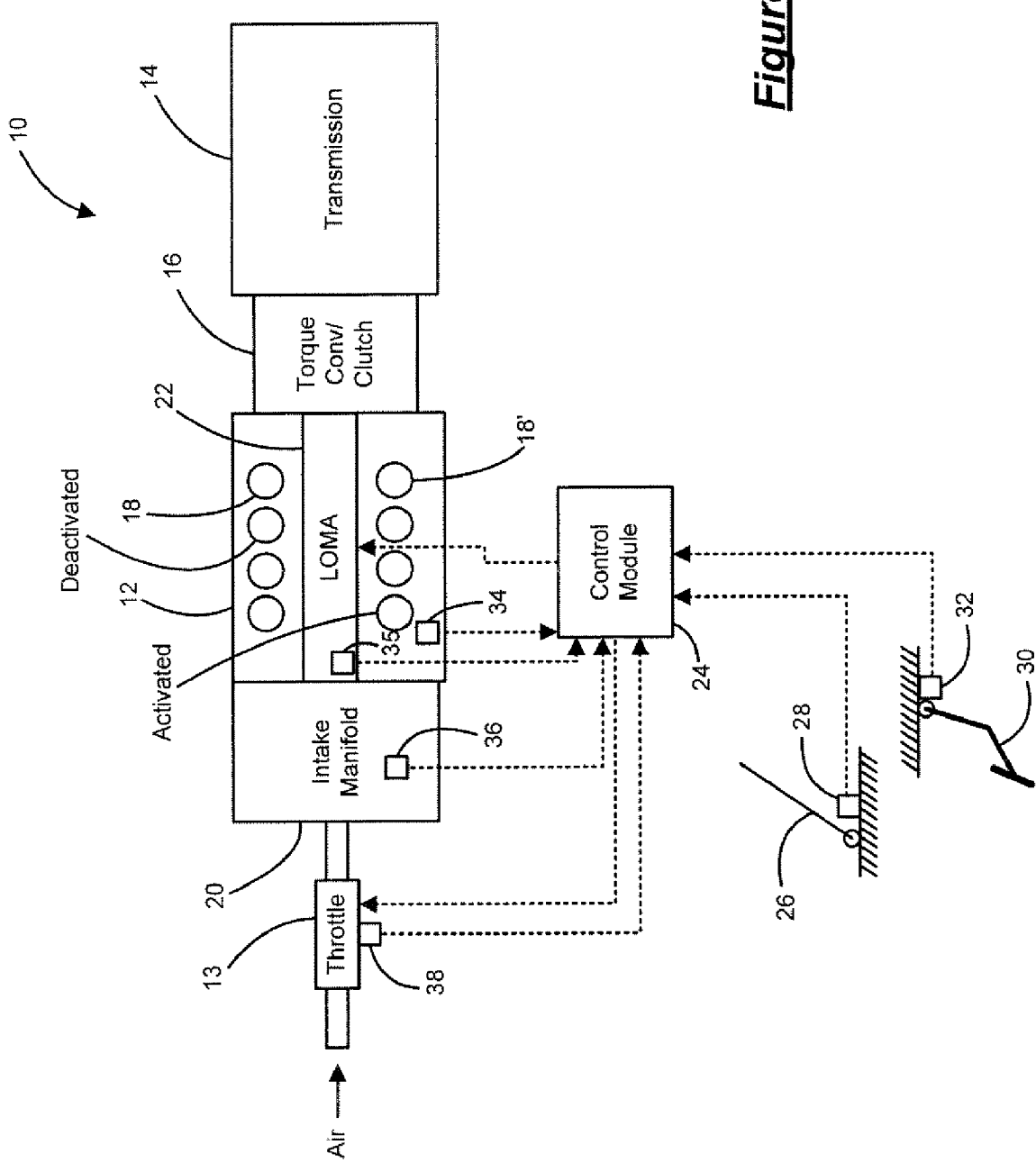
FIG. 1 is a functional block diagram illustrating a vehicle powertrain including an active fuel management (AFM) engine control system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. One or more select cylinders 18' are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine also includes a lifter oil manifold assembly (LOMA) 22 that deactivates the select cylinders 18', as described in further detail below. Although FIG. 1 depicts a LOMA 22, it can be appreciated that the diagnostic systems and methods of the present disclosure are applicable to various types of active fuel management systems including one or more solenoids.

A control module 24 communicates with the engine 12 and various inputs and sensors as discussed herein. A vehicle operator manipulates an accelerator pedal 26 to regulate the throttle 13. More particularly, a pedal position sensor 28 generates a pedal position signal that is communicated to the control module 24. The control module 24 generates a throttle control signal based on the pedal position signal. A throttle actuator (not shown) adjusts the throttle 13 based on the throttle control signal to regulate air flow into the engine 12.

The vehicle operator manipulates a brake pedal 30 to regulate vehicle braking. More particularly, a brake position sensor 32 generates a brake pedal position signal that is communicated to the control module 24. The control module 24 generates a brake control signal based on the brake pedal position signal. A brake system (not shown) adjusts vehicle braking based on the brake control signal to regulate vehicle speed. One or more knock sensors 35 generate an impact signal based on operation of the LOMA 22. An engine speed sensor 34 generates an engine speed signal based on engine speed. An intake manifold absolute pressure (MAP) sensor 36 generates a MAP signal based on a pressure of the intake manifold 20. A throttle position sensor (TPS) 38 generates a throttle position signal based on throttle position.

When the engine 12 enters an operating point to enable the deactivated mode, the control module 24 transitions the engine 12 to the deactivated mode. In an exemplary embodiment, N/2 cylinders 18 are deactivated, although one or more cylinders may be deactivated. Upon deactivation of the select cylinders 18', the control module 24 increases the power output of the remaining or activated cylinders 18. The inlet and exhaust ports (not shown) of the deactivated cylinders 18' are closed to reduce pumping losses.

The engine load is determined based on the intake MAP, cylinder mode and engine speed. More particularly, if the MAP is below a threshold level for a given RPM, the engine load is deemed light and the engine 12 could possibly be operated in the deactivated mode. If the MAP is above the threshold level for the given RPM, the engine load is deemed heavy and the engine 12 is operated in the activated mode. The control module 24 controls the LOMA 22 based on the knock sensor signal and the solenoid control, as will be discussed in further detail below.

Figure 2:
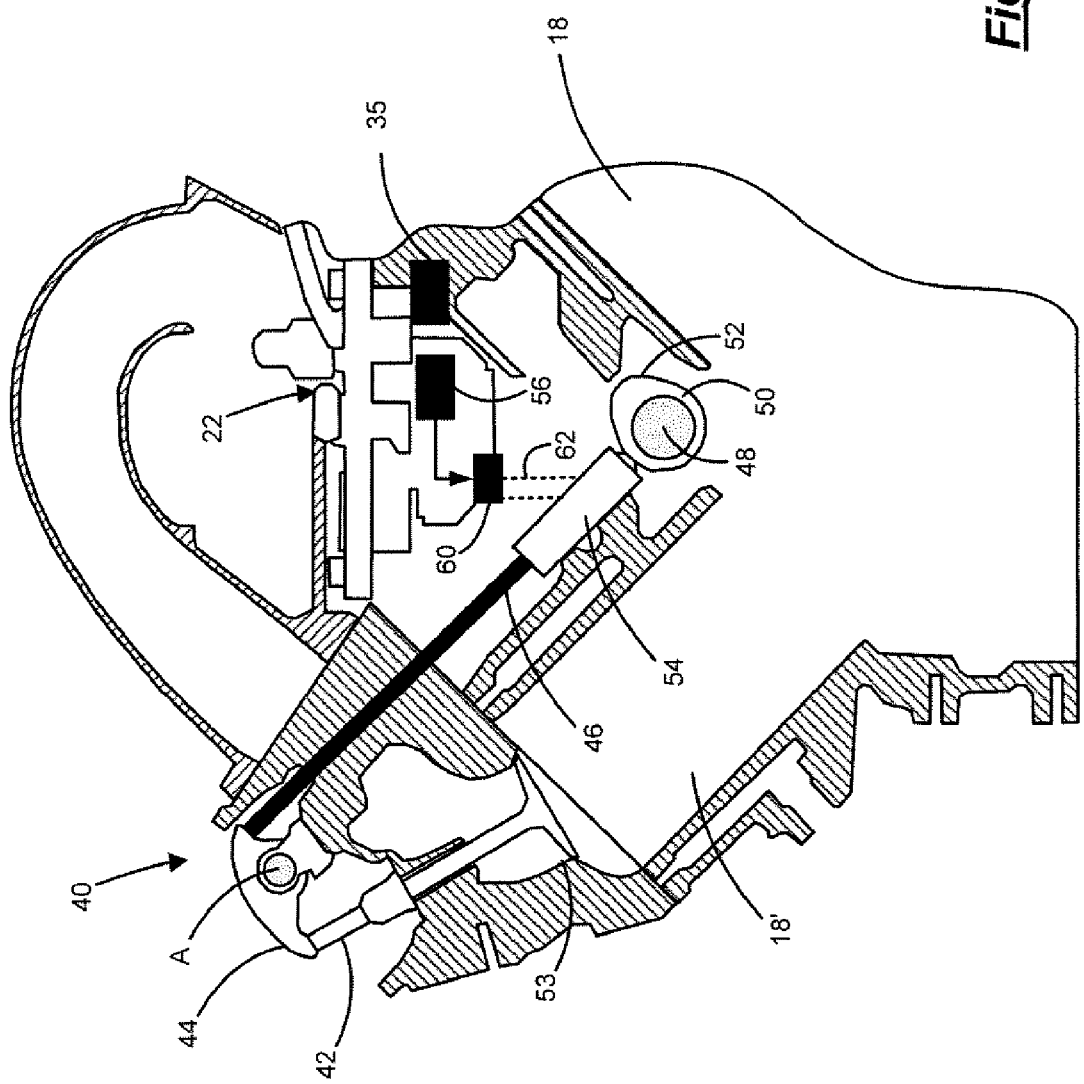
FIG. 2 is a partial cross-sectional view of the AFM engine illustrating a lifter oil manifold assembly (LOMA) and an intake valvetrain.

Referring now to FIG. 2, an intake valvetrain 40 of the engine 12 includes an intake valve 42, a rocker 44, a lifter 54 and a pushrod 46 associated with each cylinder 18. The engine 12 includes a rotatably driven camshaft 48 having a plurality of valve cams 50 disposed therealong. A cam surface 52 of the valve cams 50 engage the lifters 54 to cyclically open and close intake ports 53 within which the intake valves 42 are positioned. The intake valve 42 is biased to a closed position by a biasing member (not illustrated) such as a spring. As a result, the biasing force is transferred through the rocker 44 to the pushrod 46, then to the lifter 54, causing the lifter 54 to press against the cam surface 52.

As the camshaft 48 is caused to rotate, the valve cam 50 induces linear motion of the corresponding lifter 54 and pushrod 46. As the pushrod 46 is induced to move outward, the rocker 44 is caused to pivot about an axis (A). Pivoting of the rocker 44 induces movement of the intake valve 42 toward an open position, thereby opening the intake port 53. The biasing force induces the intake valve 42 to the closed position as the camshaft 48 continues to rotate. In this manner, the intake port 53 is cyclically opened to enable air intake.

Although the intake valvetrain 40 of the engine 12 is illustrated in FIG. 2, it is appreciated that the engine 12 also includes an exhaust valvetrain (not shown) that operates in a similar manner. More specifically, the exhaust valvetrain includes an exhaust valve, a rocker, a pushrod and a lifter associated with each cylinder 18. Rotation of the camshaft 48 induces reciprocal motion of the exhaust valves to open and close associated exhaust ports, as similarly described above for the intake valvetrain.

The LOMA 22 provides pressurized fluid to a plurality of hydraulically switching lifters 54 and includes solenoids 56 (shown schematically) associated with select cylinders 18' (see FIG. 1). The select cylinders 18' are those that are deactivated when operating the engine 12 in the deactivated mode. The lifters 54 are disposed within the intake and exhaust valvetrains to provide an interface between the cams 50 and the pushrods 46. In general, there are two lifters 54 provided for each select cylinder 18' (one lifter for the intake valve 42 and one lifter for the exhaust valve). It is anticipated, however, that more lifters 54 can be associated with each select cylinder 18' (i.e., multiple inlet or exhaust valves per cylinder 18').

Each lifter 54 is hydraulically actuated between first and second modes. The first and second modes respectively correspond to the activated and deactivated modes. In the first mode, the lifter 54 provides a mechanical connection between the cam 50 and the pushrod 46. In this manner, the cam 50 induces linear motion of the lifter 54, which is transferred to the pushrod 46. In the second mode, the lifter 54 functions as a buffer to provide a mechanical disconnect between the cam 50 and the pushrod 46. Although the cam 50 induces linear motion of the lifter 54, the linear motion is not transferred to the pushrod 46. A more detailed description of the lifters 54 is presently foregone as lifters and their operation are known to those of skill in the art.

The solenoids 56 selectively enable hydraulic fluid flow to the lifters 54 to switch the lifters 54 between the first and second modes. Although there is generally one solenoid 56 associated with each select cylinder 18' (i.e., one solenoid for two lifters), it is anticipated that more or fewer solenoids 56 can be implemented. Each solenoid 56 actuates an associated valve 60 (shown schematically) between open and closed positions. In the closed position, the valve 60 inhibits pressurized hydraulic fluid flow to the corresponding lifters 54. In the open position, the valve 60 enables pressurized fluid flow to the corresponding lifters 54 via a fluid passage 62. The pressurized hydraulic fluid flow is provided to the LOMA 22 from a pressurized hydraulic fluid source. If the solenoid malfunctions, the corresponding lifter may not operate. The knock sensor 35 generates a knock signal based on an impact of the solenoid 56 when the solenoid 56 reaches at least one of an open stop and a closed stop. Although the disclosure is discussed in the context of a LOMA solenoid, it is appreciated that the solenoid diagnostic systems and methods for the present disclosure are applicable to various solenoids of an AFM system.

Figure 3:
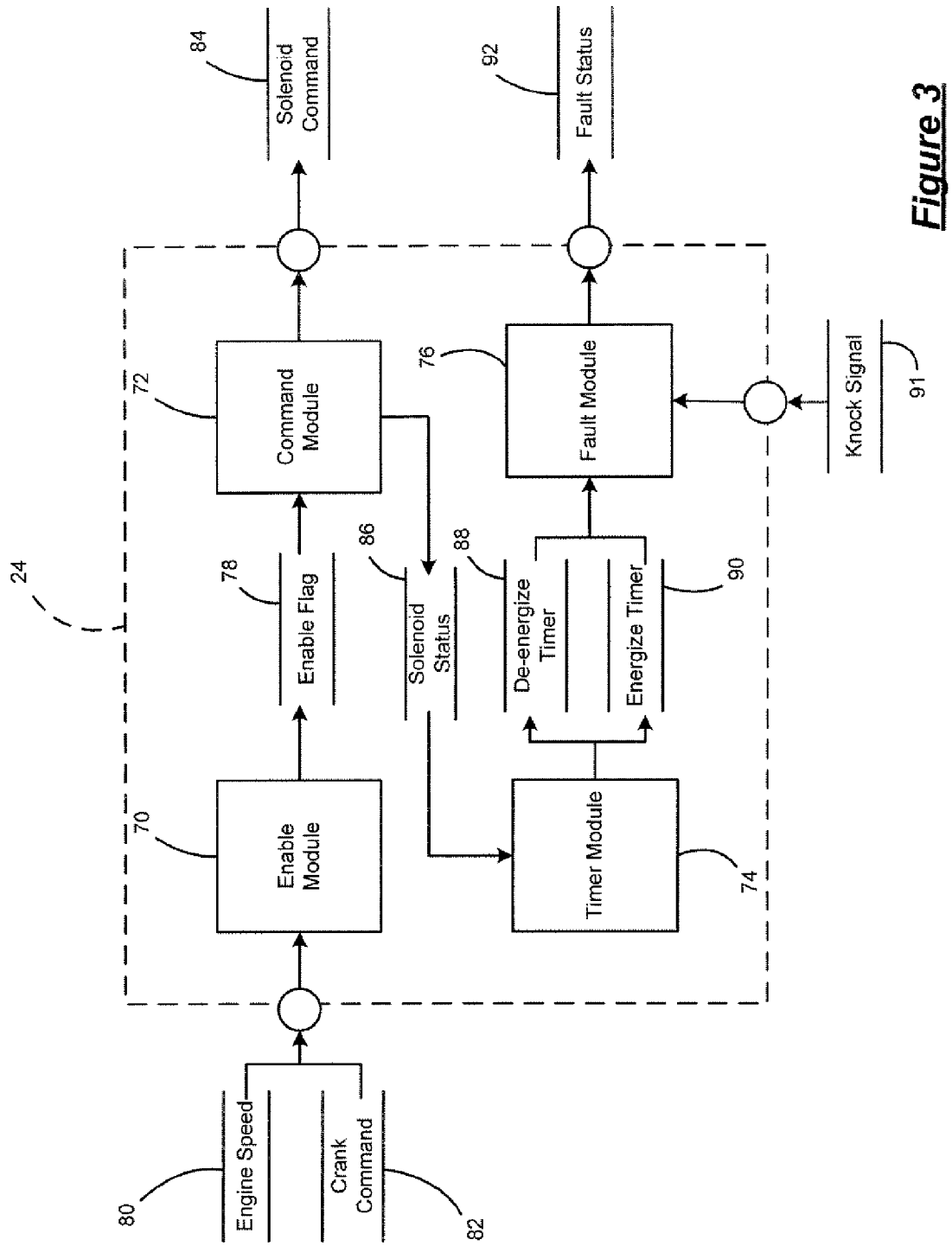
FIG. 3 is a dataflow diagram illustrating an AFM solenoid diagnostic system.

Referring now to FIG. 3, a dataflow diagram illustrates various embodiments of an AFM solenoid diagnostic system that may be embedded within the control module 24. Various embodiments of AFM solenoid diagnostic systems according to the present disclosure may include any number of sub-modules embedded within the control module 24. The sub-modules shown may be combined and/or further partitioned to similarly diagnose one or more solenoids 56 of the AFM engine. Inputs to the system may be sensed from the vehicle 10 (FIG. 1), received from other control modules (not shown) within the vehicle 10 (FIG. 1), and/or determined by other sub-modules (not shown) within the control module 24. In various embodiments, the control module of FIG. 3 includes an enable module 70, a command module 72, a timer module 74, and a fault module 76.

The enable module 70 monitors engine speed 80 and a crank command 82. If the engine speed 80 is reduced to zero and/or there is no crank command 82, the enable module 70 enables the diagnostic via an enable flag 78. The command module 72 selectively generates a solenoid command 84 that energizes and de-energizes the LOMA solenoid 56 when the enable flag 78 indicates that the diagnostic is enabled. The command module 72 generates a solenoid status flag 86 indicating whether an energize signal or de-energize signal is commanded. The timer module 74 selectively sets and resets one of a de-energize timer 88 and an energize timer 90 based on the solenoid status 86. More particularly, the timer module 74 begins the energize timer 90 after the solenoid status 86 indicates that an energize signal is commanded. The timer module 74 begins the de-energize timer 88 after the solenoid status 86 indicates that the de-energize signal is commanded.

The fault module 76 determines a fault status 92 based on the energize and de-energize timers 88, 90 and a knock signal 91. The fault module 76 processes the knock signal 91 based on a band-pass filter. The processed signal is evaluated to determine if the solenoid has reached an open stop or a closed stop based on an impact. More particularly, if the value of the energize timer 90 is greater than or equal to a timeout threshold and the knock signal has not indicated a solenoid impact, the fault status is set to TRUE or Test Fail. Even if the knock signal 91 indicates a solenoid impact at a time within the timeout threshold, if the time at which the knock signal indicated a solenoid impact is outside an energized time range, the fault status is set to TRUE or Test Fail. Otherwise the fault status remains set to FALSE or Test Pass.

Similarly, if the value of the de-energize timer 88 is greater than or equal to a second timeout threshold and the knock signal 91 has not indicated a solenoid impact, the fault status is set to TRUE or Test Fail. Even if the knock signal 91 indicates a solenoid impact at a time within the de-energize timer threshold, if the time at which the knock signal 91 indicated a solenoid impact is outside an energized time range, the fault status is set to TRUE or Test Fail. Otherwise the fault status remains set to FALSE or Test Pass.

Figure 4:
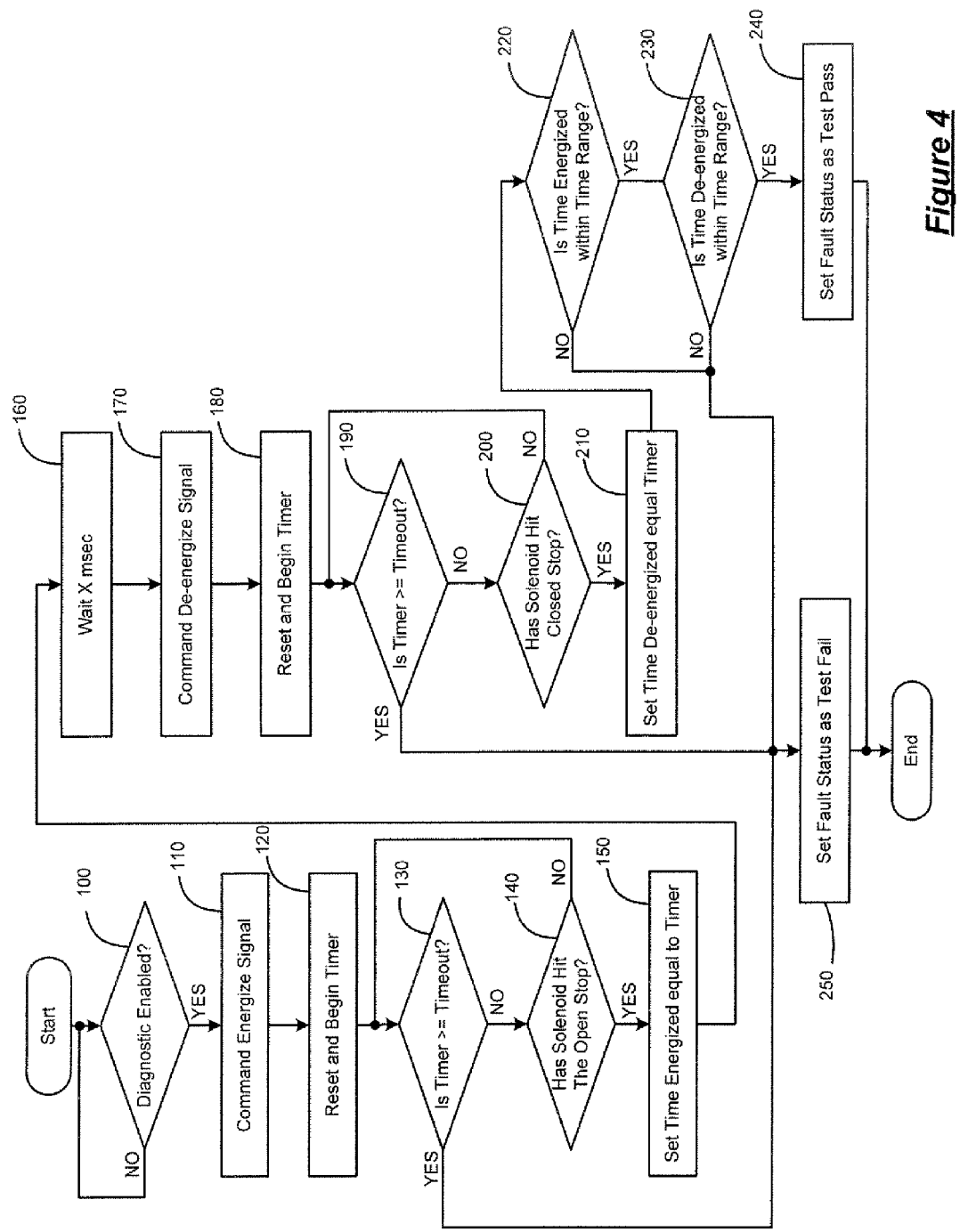
FIG. 4 is a flowchart illustrating an AFM solenoid diagnostic method.

Referring now to FIG. 4, a flowchart illustrates various embodiments of an AFM solenoid diagnostic method. The method may be performed periodically at times when the engine is not running. In various embodiments, one or more solenoids 56 can be diagnosed based on an energized state, based on a de-energized state, or based on both as shown in FIG. 4. At 100, if the diagnostic enable conditions are met, control commands an energize signal at 110. The energize timer is reset and begun at 120. If the energize timer is less than a timeout threshold at 130 and the knock signal indicates that the solenoid has hit the open stop at 140, a time energized is set equal to the timer value at 150. Thereafter, control proceeds to wait X milliseconds at 160 before commanding a de-energize signal. If, at 140, the knock signal does not indicate that the solenoid hit the open stop and, at 130, the energize timer is greater than or equal to the timeout threshold, the fault status is set to TRUE or Test Fail at 250.

After control waits X milliseconds at 160, control commands a de-energize signal at 170. Control resets and begins the de-energize timer at 180. If the de-energize timer is less than a timeout threshold at 190 and the knock signal indicates that the solenoid has hit the closed stop at 200, a time de-energized is set equal to the timer value at 210. Thereafter, control proceeds to evaluate the time energized and the time de-energized at 220 and 230. If, at 200, the knock signal does not indicate that the solenoid hit the closed stop and, at 190, the de-energize timer is greater than or equal to the timeout threshold, the fault status is set to TRUE or Test Fail at 250.

If, at 220, the time energized is outside of an energized time range the fault status is set to Test Fail at 250. If the time energized is within the energized time range at 220 and the time de-energized is outside of a de-energized time range at 230, the fault status is set to Test Fail at 250. Otherwise, if the time energized is within the energized time range and the time de-energized is within the de-energized time range at 230, control sets the fault status to Test Pass at 240.

Figure 5:
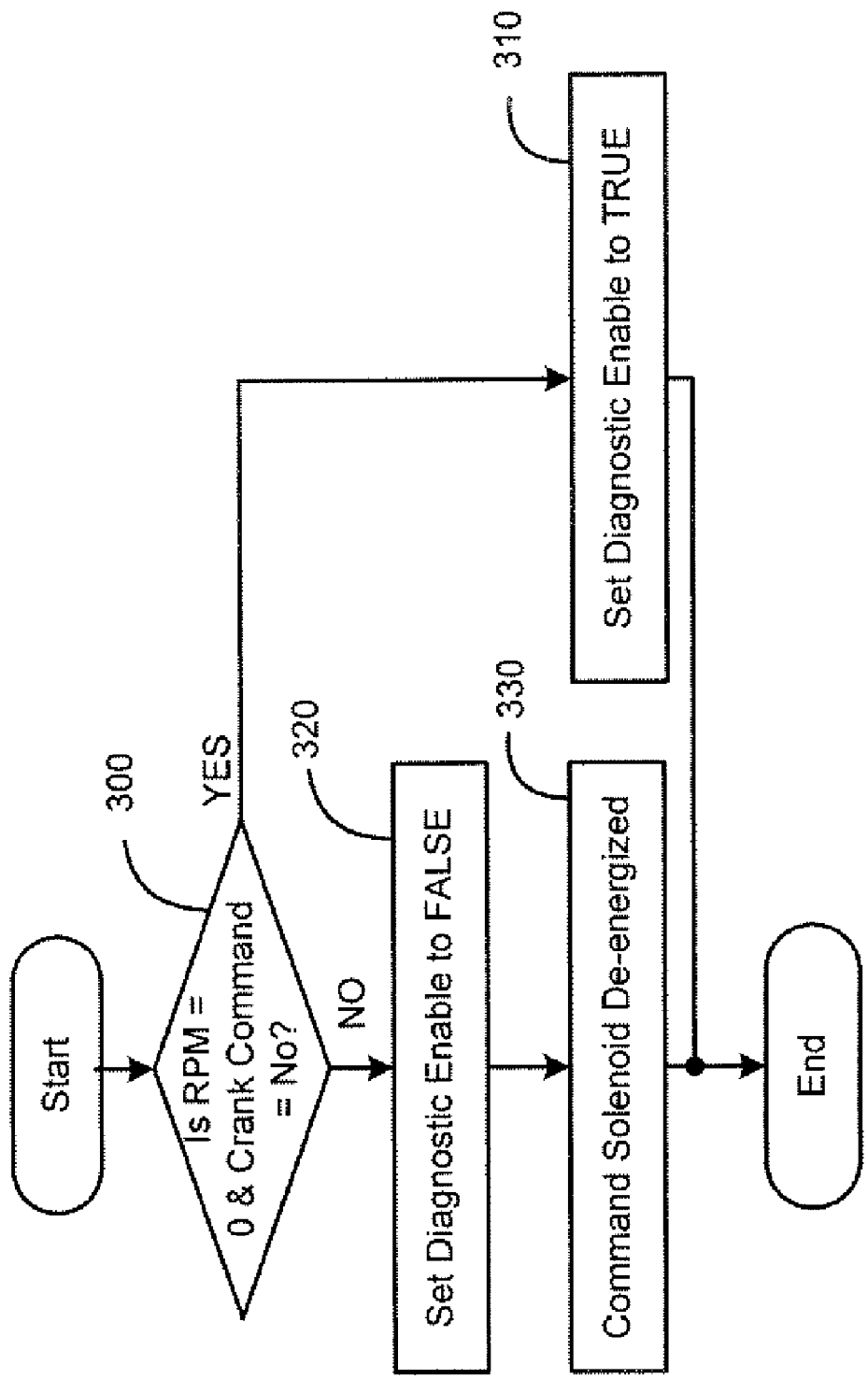
FIG. 5 is a flowchart illustrating an AFM solenoid diagnostic enable method.

Referring now to FIG. 5, a flowchart illustrates various embodiments of an AFM solenoid diagnostic enable method. The method may be run periodically throughout a drive cycle or as part of a procedure performed by a service person. At 300, if engine speed is zero and the crank command indicates NO, the diagnostic enable flag is set to TRUE at 310. Otherwise, if the engine speed is not equal to zero or the crank command indicates YES at 200, the diagnostic enable flag is set to FALSE at 320 and a de-energize signal is commanded at 330.

As can be appreciated, all comparisons discussed above can be implemented in various forms depending on the selected values for the comparison. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A diagnostic system for an active fuel management (AFM) solenoid of an internal combustion engine, comprising:
    a command module that selectively commands a solenoid signal to energize and de-energize the AFM solenoid;
    a timer module that activates a timer based on a status of the solenoid signal; and
    a fault module that selectively diagnoses a fault of the AFM solenoid based on the timer and a knock sensor signal.

2. The system of claim 1 wherein the knock sensor signal indicates a solenoid impact when the solenoid reaches at least one of an open stop and a closed stop.

3. The system of claim 1 further comprising an enable module that selectively enables the command module based on engine speed and a crank signal.

4. The system of claim 1 wherein the fault module diagnoses a solenoid failure when a value of the timer is greater than a timeout threshold and the knock signal has not indicated a solenoid impact.

5. The system of claim 1 wherein the fault module diagnoses a solenoid failure when a solenoid impact time is outside of a time range.

6. The method of claim 1 wherein the fault module diagnoses the solenoid as operational when a value of the timer is within a specified time range and the knock signal indicated a solenoid impact.

7. The system of claim 1 wherein the timer module activates the timer when the solenoid signal is first commanded.

8. The system of claim 1 wherein the fault module sets a fault status indicator based on the selectively diagnosing a fault of the AFM solenoid.

9. An active fuel management (AFM) engine diagnostic system, comprising:
    a lifter oil manifold assembly (LOMA) solenoid that controls hydraulic fluid to and from a valve lifter;
    a knock sensor that generates an impact signal based on an operation of the LOMA solenoid; and a control module that commands a LOMA solenoid signal, begins a timer after commanding the solenoid signal, and selectively diagnoses a fault of the LOMA solenoid based on the impact signal and the timer.

10. The system of claim 9 wherein the control module processes the knock sensor signal based on a band-pass filter.

11. The system of claim 9 wherein the control module diagnoses a solenoid failure if a value of the timer is greater than a timeout threshold and the knock signal has not indicated a solenoid impact.

12. The system of claim 9 wherein the control module diagnoses a solenoid failure if a solenoid impact time is outside of a time range.

13. A method of diagnosing an active fuel management (AFM) solenoid of an internal combustion engine, comprising:
    selectively commanding a solenoid signal to energize and de-energize the AFM solenoid;
    activating a timer based on a status of the solenoid signal;
    monitoring a knock sensor signal; and
    selectively diagnosing a fault of the AFM solenoid based on the timer and the knock sensor signal.

14. The method of claim 13 further comprising selectively enabling the commanding of the solenoid signal based on engine speed and a crank signal.

15. The method of claim 13 wherein the diagnosing further comprises diagnosing a solenoid failure when a value of the timer is greater than a timeout threshold and the knock signal has not indicated a solenoid impact.

16. The method of claim 13 wherein the diagnosing further comprises diagnosing a solenoid failure when a time at which the knock signal indicates a solenoid impact is outside of a time range.

17. The method of claim 13 wherein the diagnosing further comprises diagnosing the solenoid as operational when a value of the timer is within a specified time range and the knock signal has indicated a solenoid impact.

18. The method of claim 13 further comprising generating a knock sensor signal based on an input of the AFM solenoid wherein the input occurs at, at least one of, a closed stop and an open stop.

19. The method of claim 13 further comprising setting a fault status indicator based on the diagnosing the AFM solenoid.

* * * * *